Sept. 27, 1966          A. LECLOU          3,275,181
MECHANICAL COUPLING DEVICE, ESPECIALLY FOR PRESSURE VESSELS
Filed June 13, 1963          3 Sheets-Sheet 1
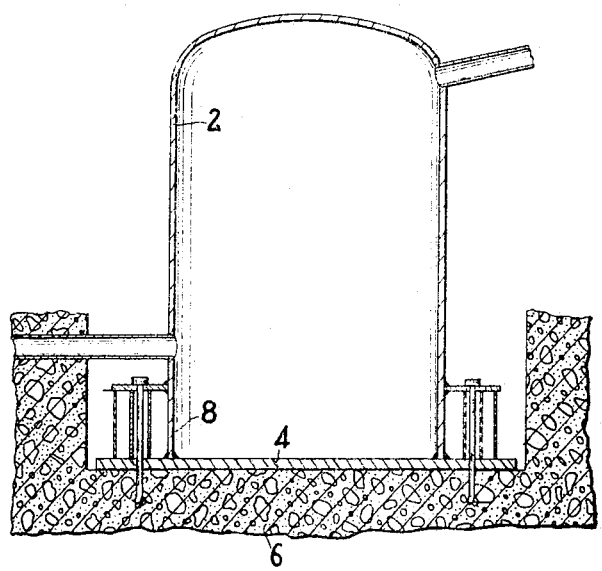
FIG. 1 *PRIOR ART*
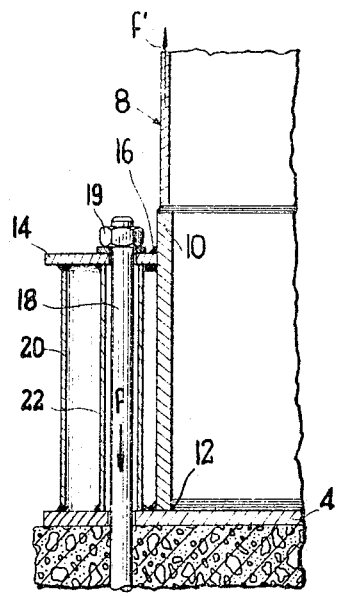
FIG. 2
*PRIOR ART*

Sept. 27, 1966  A. LECLOU  3,275,181
MECHANICAL COUPLING DEVICE, ESPECIALLY FOR PRESSURE VESSELS
Filed June 13, 1963  3 Sheets-Sheet 2

Sept. 27, 1966  A. LECLOU  3,275,181
MECHANICAL COUPLING DEVICE, ESPECIALLY FOR PRESSURE VESSELS
Filed June 13, 1963  3 Sheets-Sheet 3
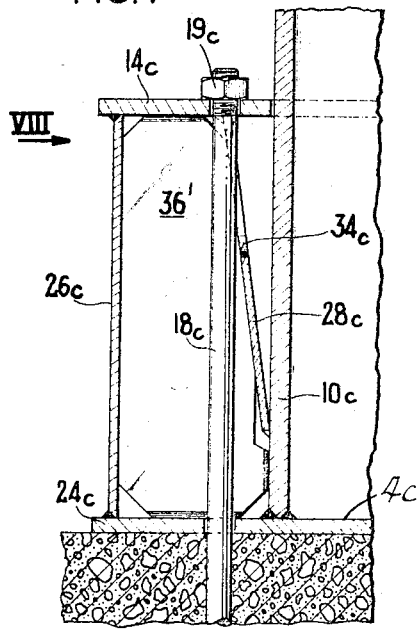
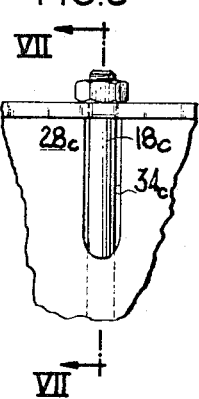
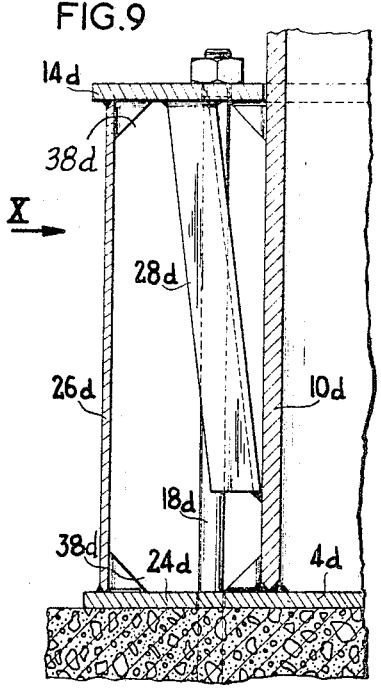
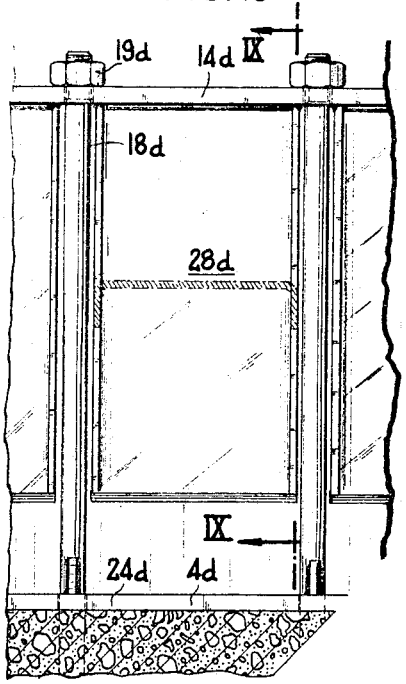

United States Patent Office 3,275,181
Patented Sept. 27, 1966

3,275,181
MECHANICAL COUPLING DEVICE, ESPECIALLY FOR PRESSURE VESSELS
André Leclou, Saint-Maur-des-Fosses, France, assignor to Commissariat à l'Energie Atomique, Paris, France
Filed June 13, 1963, Ser. No. 287,583
Claims priority, application France, July 24, 1962, 904,967
6 Claims. (Cl. 220—18)

The present invention relates to a coupling device, especially for pressure vessels, which is more especially applicable to the mechanical coupling between two components of a vessel having a general axis of symmetry.

It is frequently necessary to construct a leak-tight vessel in at least two constituent parts, for example the vessel body or shell, and a base. In order to ensure the complete safety which is necessary in certain fields, it is necessary to place reliance on separate elements for the purpose of ensuring leak-tightness of the coupling and the absorption of the mechanical stresses to which said coupling is subjected.

The tanks of nuclear reactors present a particularly critical problem in this respect inasmuch as the pressures for which said tanks are designed with a view to providing the requisite safety are relatively high and the general design of such tanks from the aspect of their detail assembly must be suitable in order to permit of resistance to such substantial stresses as are liable to occur.

Among the various expedients employed in the prior art, one solution may be mentioned (in its application to the attachment of a cylindrical tank body to a flat base which is integral with an anchoring-block) whereby leak-tightness is ensured by a welded joint between the base and the body and stresses are taken up by a device which comprises a ring attached to the body at a certain distance from the base and parallel to this latter and a series of anchor-bolts by means of which the said ring is coupled to the anchoring-block. The diameter of the base is preferably greater than that of the tank body and spacer members can be interposed between the base and the ring. This solution has unfortunately a serious drawback in that the anchoring efforts are displaced relatively to the efforts which are applied to the tank, thereby resulting in the appearance of undesirable moments which tend to deform the tank.

The present invention is directed to the design of a mechanical coupling device which substantially reduces the displacement of the anchoring efforts relatively to the wall of the tank by virtue of the incorporation of a device which is both simple and sturdy and which can readily be checked.

The invention proposes a device for providing a mechanical coupling between two components of a vessel which has a general axis and which is subjected to forces which tend to separate said components, said device comprising a first and a second element which are respectively integral with the first component and the second component and which are disposed in a substantially radial direction, and means for coupling said elements which are disposed parallel to the general axis and which are designed to resist separation forces, characterized by mechanical effort-transferring means which are inclined to the general axis and which couple at least one of said elements to the corresponding component.

The invention further consists in other arrangements which can preferably be employed in conjunction with the foregoing but which can also be employed independently thereof. All the arrangements referred-to will be more readily understood by reference to the description which follows below and which relates to various modes of practical application of the invention as given by way of example and not in any sense by way of limitation. The description is given with reference to the accompanying drawings, in which:

FIG. 1 shows a tank consisting of a cylindrical barrel coupled by means of a conventional device to a flat bottom which is integral with an anchoring-block, as represented in cross-section taken along a plane passing through the axis of the tank.

FIG. 2 is a view on a large scale of the coupling device of FIG. 1 as represented in cross-section taken along a plane passing through the axis of the tank.

FIG. 7 is a view of a third form of embodiment of the invention, as represented in cross-section taken along a plane passing through the axis of the vessel.

FIG. 8 is an expanded detail view in the direction of the arrow VIII of FIG. 7.

FIG. 9 illustrates a fourth form of embodiment of the invention, as represented in longitudinal cross-section taken along the axis of the vessel.

FIG. 10 is a view in cross-section taken along the line X—X of FIG. 9.

Figures 3, 4:
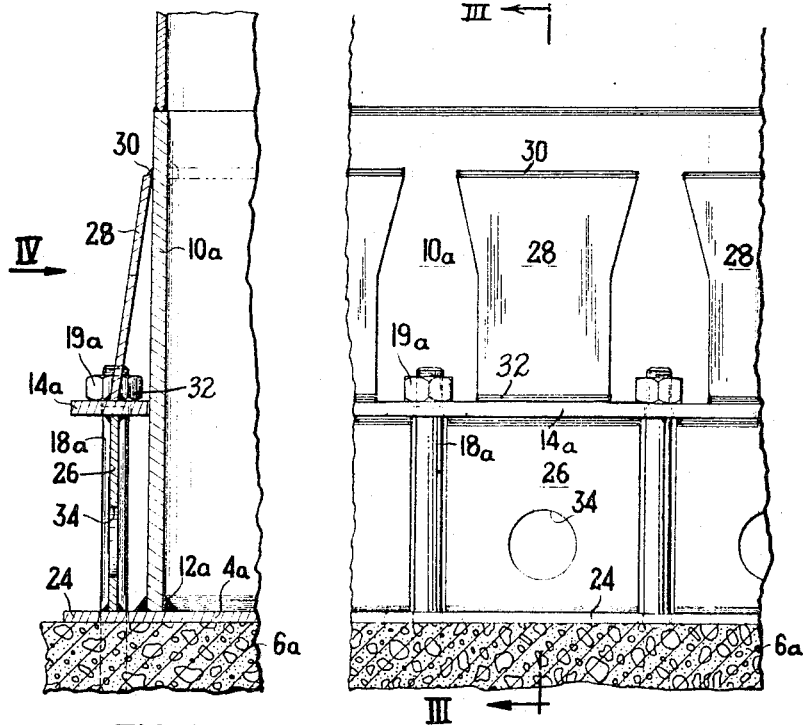
FIG. 3 is a view of a coupling device constituting a first form of embodiment of the invention, as represented in longitudinal cross-section taken along a plane passing through the axis of the vessel (plane III—III of FIG. 4).
FIG. 4 is a partial expanded view of the device of FIG. 3 in the direction of the arrow IV of FIG. 3.

FIG. 1 shows a vessel consisting of a cylindrical-spherical tank body 2 and a base 4 which is integral with an anchoring-block 6. The lower portion 8 of the tank which is joined to the base is cylindrical and has a diameter which is smaller than that of the base. For the sake of clarity, the tank anchoring device, which is of conventional design, is shown in the figure as having longitudinal and especially radial dimensions which are distinctly larger than is actually the case.

The conventional device for providing a mechanical coupling between the tank body and the base is illustrated in detail in FIG. 2. The cylindrical portion 8 is constructed as a rule of barrel-plates or strakes which are assembled together. The bottom barrel-plate 10 has preferably a greater thickness than the adjacent barrel-plate on account of the higher stresses which said bottom plate has to accommodate.

The tightness of the junction between the base and the tank is ensured by a welded joint 12. The forces which tend to separate the base from the tank (internal pressure, aerodynamic forces acting on the tank) are transmitted from the barrel-plate 10 to the anchoring-block 6 by means of a device comprising an annular plate 14 which is secured to the barrel-plate 10, for example by welding at 16, provision being made for a series of tie-rods such as the tie-rod 18 which are stretched between the anchoring-block and the plate 14 and if necessary, for distance pieces such as the distance-piece 22 which set the spacing of the plate 14 and the base 4. The tie-rods are constituted, for example, by anchor-bolts which are parallel to the axis of the tank and which pass through the base 4 through the plate 14 through openings of sufficient diameter, said bolts being fitted with nuts 19 by means of which the force exerted on the plate can be regulated. The distance-pieces 20 and 22 comprise, for example, a spacing ferrule 20 which is concentric with the barrel-plate 10 and tubes 22 which each surround a bolt 18.

Other members such as shoulder-brackets or three-angle structures can also be employed as distance-pieces.

FIG. 2 shows that this arrangement displaces off-center the positioning or anchoring forces which are applied in the direction of the arrow $f$ relatively to the forces which tend to lift the tank body and which are applied in the direction of the arrow $f'$, thereby resulting in the appearance of undesirable couples which tend to deform the barrel-plates.

Figure 5:
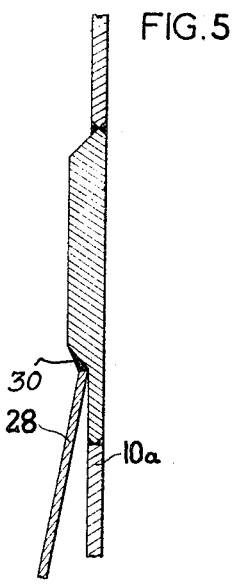
FIG. 5 is a view on a large scale illustrating a design solution for the assembly of gussets on the barrel, in the form of embodiment of FIG. 3.

FIGS. 3 to 5 show a coupling device which constitutes a first form of embodiment of the invention. In these figures, those elements which correspond to others which are illustrated in FIGS. 1 and 2 are designated by the same reference numeral to which has been assigned the index $a$.

The bottom barrel-plate 10a of the tank body is secured to the flat base 4a by means of a welded joint 12a which no longer has any mechanical function. The base is supported on a concrete foundation-block 6a which is designed to be subjected to the anchoring stresses of the tank. The diameter of the base is larger than that of the barrel 10a in order to form an annular sole-piece 24. An annular plate 14a is disposed around the barrel 10a. Said annular plate is coupled to the sole-piece 24 by means of a spacer device constituted by a cylindrical or polygonal web made up of a series of plates 26 which are secured to the sole-piece and to the annular plate. The combined assembly of the three parts 14a, 24 and 26 constitutes a circular girder which is anchored to the concrete foundation-block 6a by means of a series of tie rods 18a constituted, for example, by bolts fitted with nuts 19a which bear against the plate 14a.

The elements which have been described in the foregoing are of conventional design. However, the plate 14a, instead of being attached directly to the barrel-plate 10a, is joined to an annular zone which is located above the plate by means of support plates 28 which work in tension. Said support plates 28 are provided, for example, with the shape which is shown in FIG. 4 so as to leave passageways for the nuts 19a, and are welded at 30 and 32 respectively to the barrel-plate 10a and to the plate 14a. The support plates are distributed angularly along a circle on which are also disposed the junctions of the support plates 28 with the plate 14a. Vertical stresses are accordingly transmitted from the tank to the coupling device in a zone which is distinctly separate from the junction with the base. Furthermore, by disposing the support plates 28 along a surface having a sufficiently small conicity, it is possible to reduce to a very substantial extent the angle of inclination of the efforts relatively to the structure which is intended to transmit said efforts. The residual horizontal component can also be balanced by means of plate 28.

On condition that provision is made in the sheets 26 which form the web of the girder for passageways 34 of sufficient size, it is possible to inspect all the welded joints 12a and anchoring systems. The arrangement further permits the execution of welds of good quality, the only purpose of which is to ensure the integrity of the joint.

It can prove useful to give to the tank body an overthickness at the level of the junction of the support plates 28 as shown in FIG. 5. With this object in view, plate 10'a is given an area of greater thickness at 10"a and parts 28 are welded thereto at 30.

By way of example, the thicknesses to be provided in the case of a steel tank which is intended to resist a pulling force of 150 tons per linear meter can have the following orders of magnitude: barrel-plate 10a—32 mm.; annular plate 14a—40 mm.; sheets 26—20 mm.; support plates 28—16 mm. The anchoring stresses can be taken up by tie-rods 60 millimeters in diameter and having a distance between centers of 340 millimeters and a distance of 68 millimeters with respect to the wall. The lengths of the support plates along the axis can be of the order of 540 millimeters. These figures do not take into account particular additional stresses (such as thermal stresses, for example).

Figure 6:
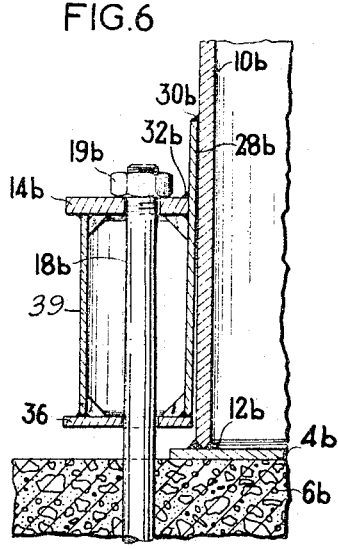
FIG. 6 illustrates a second form of embodiment of the invention, as represented in cross-section taken along a plane passing through the axis of the vessel.

FIG. 6 illustrates a variant of the form of embodiment which is shown in FIGS. 3 to 5; those components which have already been illustrated in the previous figures are designated by the same reference numerals to which is assigned the index $b$.

The device of FIG. 6 is again intended to join a bottom barrel-section 10b to the stationarily fixed assembly which is constituted by a base 4b to which the body is welded at 12b and an anchoring-block 6b. In this arrangement, the peripheral girder is replaced by a box 36, 38, 14b, 28b.

The disadvantage of this form of embodiment is of course that the spaced relationship between the tank body and the base is not fixed mechanically, the effort applied by the nuts 19b on the box being taken up by the welded joint between the barrel-plate 10b and the support plate 28b.

The conicity of the support plate 28b must be chosen so that the deformations of the anchoring structure do not interfere with the vessel. The twisting deformations of said assembly can be limited by the abutment of the sole-piece against the base or the abutment of the support plate against the vessel.

FIGS. 7 and 8 show a form of embodiment which is essentially distinguished from the two previous forms of embodiment in that the support plate works in compression and not in tension. In these two figures, the parts which correspond to those which have already been described are designated by the same reference numerals to which there has been assigned the index $c$.

In FIG. 7, there can again be seen the bottom barrel-plate 10c, the annular plate 14c, the tie-rods 18c and their nuts 19c. As in the form of embodiment of FIGS. 3 to 5, the base 4c has a diameter which is sufficiently large to constitute a sole-piece 24c. A cylindrical web 26c which is welded to the plate 14c and to the sole 24c fixes the spacing between said plate and said sole.

The frusto-conical support plate 28c is in this case disposed between the cylindrical web 26c and the bottom barrel-plate 10c. Said support plate is provided with a series of slots 34c for the purpose of welding said plate along the center-line of the anchor-bolts and of ensuring that the anchoring stresses are taken up under good conditions.

The openings noted above are shown in FIG. 8 in which the web 26c has not been illustrated for the sake of clarity of the drawing.

The bottom arris of the support plate 28c is welded to the barrel-plate 10c as low down as possible while nevertheless avoiding the zone which is subjected to the stresses exerted at the junction of the barrel and the base 4c.

In order to stiffen the girder which is formed by the plate 14c, the tubular web 26c and the sole-piece 24c, provision can be made for spacer sheets 36 which are disposed in diametral planes between the anchor-bolts and which are welded to the components of said girder and to the support plate.

Should it prove feasible to permit of a decentration of the efforts applied, the support plate 28c may accordingly be disposed so as to be located to the rear of the center-line of the anchor-bolts instead of being level with this latter. This arrangement permits the use of a continuous support plate. In either case the welded joints at the base can be inspected and the anchoring arrangements checked.

The form of embodiment which is illustrated in FIGS. 9 and 10 is distinguished from that of FIGS. 7 and 8 only in the replacement of the support plates by a series of sheets which are folded in order to provide these latter with a certain rigidity. In FIGS. 9 and 10, those members which correspond to other members hereinbefore described are designated by the same reference numeral to which there has been assigned the index $d$. In FIG. 10, the tubular web 26d has not been illustrated for the sake of clarity of the drawings.

In the device of FIGS. 9 and 10, the support plate is replaced by a series of sheets 28d having a U-section with the flanges folded outwards as shown by the cross-section in chain-dotted lines in FIG. 10. Each sheet is placed between two successive anchor-bolts 18d.

Welded gussets 38d can be provided in order to stiffen the girder which is formed by the annular plate 14d, the web 26d and the sole-piece 24d.

Although the foregoing design solutions have been described and illustrated only insofar as concerns their application to the anchoring of a cylindrical tank, a large number of other uses are also made possible. It accordingly follows in particular that these solutions can be adopted for the purpose of anchoring any tank which has a general axis of symmetry. Certain forms of embodiment, and especially the form of embodiment which is illustrated in FIGS. 3 to 5 can also serve for the purpose of coupling two components of a same vessel which have the same general axis of symmetry and opposite facing edges such as a large-size flange assembly, for example. It is wholly apparent that these alternative forms as well as all other variants which remain within the scope of equivalent mechanical means are covered by this patent.

What I claim is:

1. In a mechanical coupling device for a vessel having a longitudinal center line, first end and second wall components for the vessel subjected to stresses which tend to separate said components, a mechanical coupling device between said first and said second components, said device comprising first and second elements secured to said first and to said second components, respectively, said elements being located radially outwardly from said second wall components, and coupling means parallel to said center line located radially outwardly from said second wall component and adapted to draw said components together, mechanical force transfer means connecting at least one of said elements and the corresponding one of said components, said transfer means being connected to said element at a distance from the longitudinal center line of the vessel substantially equal to that of said coupling means and connected to the corresponding one of said components at a level along the center line remote from the level of attachment thereof to said element.

2. Mechanical coupling device in accordance with claim 1, wherein said mechanical force transfer means comprise a frusto-conical skirt, one large-diameter extremity of which is secured to said element and one small-diameter extremity of which is secured to the corresponding one of said components.

3. Mechanical coupling device in accordance with claim 1, at least one of said elements being a ring located in a plane at right angles to the longitudinal center line of the vessel.

4. Mechanical coupling device in accordance with claim 1, at least one of said elements comprising two rings spaced apart along the center line of the vessel and coupled together by said mechanical force transfer means and by a cylindrical barrel-plate which is parallel to the vessel.

5. A coupling structure comprising a horizontal base plate resting on a concrete foundation, a tank shell having a vertical axis and a substantially cylindrical sidewall supported upright on the foundation with the lower end of said sidewall welded to said base plate, a radially directed annular element located around said shell, force transfer wall means located outside of said shell at an angle to said axis and secured at one end thereof to said shell and at the other end thereof to said annular element, and vertical anchoring bolts secured to the foundation and to said annular element and located at a distance from said axis substantially equal to that of said connection between said wall means and said annular element.

6. Mechanical coupling device in accordance with claim 1, said coupling means comprising a plurality of bolts located at even angular intervals and said mechanical means comprising a plurality of support plates located between successive bolts.

References Cited by the Examiner
UNITED STATES PATENTS 2,301,061  11/1942  Logeman _____ 220—18

FOREIGN PATENTS 1,122,435  5/1956  France.

FRANKLIN T. GARRETT, *Primary Examiner.*